US012113262B2

(12) United States Patent
Wu et al.

(10) Patent No.: US 12,113,262 B2
(45) Date of Patent: Oct. 8, 2024

(54) CROSS-COUPLING STRUCTURE FOR DIELECTRIC CAVITY FILTERS

(71) Applicant: Universal Microwave Technology, Inc., Keelung (TW)

(72) Inventors: Tung-Yi Wu, Keelung (TW); Sheng-Feng Yeh, New Taipei (TW); Wun-Kai Wu, Yilan County (TW); Sung-Fan Liu, New Taipei (TW); Chien-Chih Lee, Taipei (TW); Jen-Ti Peng, Keelung (TW)

(73) Assignee: UNIVERSAL MICROWAVE TECHNOLOGY, INC., Keelung (TW)

( * ) Notice: Subject to any disclaimer, the term of this patent is extended or adjusted under 35 U.S.C. 154(b) by 211 days.

(21) Appl. No.: 18/071,642

(22) Filed: Nov. 30, 2022

(65) Prior Publication Data

US 2024/0178536 A1 May 30, 2024

(51) Int. Cl.

| | |
|---|---|
| ***H01P 1/209*** | (2006.01) |
| ***H01P 1/20*** | (2006.01) |
| ***H01P 1/208*** | (2006.01) |
| ***H01P 5/02*** | (2006.01) |
| ***H01P 7/10*** | (2006.01) |

(52) U.S. Cl.

CPC .......... *H01P 1/2002* (2013.01); *H01P 1/2084* (2013.01); *H01P 1/209* (2013.01); *H01P 5/02* (2013.01); *H01P 7/10* (2013.01)

(58) Field of Classification Search

CPC ........ H01P 1/20; H01P 1/2002; H01P 1/2084; H01P 1/2086; H01P 1/208; H01P 1/207; H01P 1/201; H01P 1/205; H01P 1/2053; H01P 1/209; H01P 7/10; H01P 7/105; H01P 7/06; H01P 7/04

See application file for complete search history.

(56) References Cited

U.S. PATENT DOCUMENTS 6,081,175 A * 6/2000 Duong .................. H01P 1/2053 333/219.1
6,353,373 B1 * 3/2002 Liang .................... H01P 1/2084 333/219.1
2007/0139142 A1 * 6/2007 Li ......................... H01P 1/2053 333/203
2019/0372189 A1 * 12/2019 Jiang ......................... H01P 7/06

* cited by examiner

*Primary Examiner* — Stephen E. Jones

(74) *Attorney, Agent, or Firm* — Ying-Ting Chen; Law Office of Michael Chen

(57) ABSTRACT

A cross-coupling structure for dielectric cavity filters includes a base and a tuner. The base is communicated with plural resonant cavities, a side through hole and a blind hole, and has a first channel formed between two adjacent resonant cavities which are not used for producing cross-coupling, and a second channel the resonant cavities formed between two adjacent resonant cavities which are used for producing cross-coupling. The side through hole is penetrated through the base and communicated with the second channel. The blind hole is formed on a wall of the second channel and has an opening facing the side through hole. The tuner is entered into the second channel from the side through hole and extended into the blind hole and can be adjustably moved between the opening of the blind hole and the bottom of the blind hole to set a cross-coupling amount target value.

6 Claims, 4 Drawing Sheets

CROSS-COUPLING STRUCTURE FOR DIELECTRIC CAVITY FILTERS

FIELD OF THE INVENTION

The present disclosure relates to the technical field of a cross-coupling structure, in particular to the cross-coupling structure for dielectric cavity filters applied in the area of microwave radio frequency.

BACKGROUND OF THE INVENTION

Dielectric cavity filter is a device using a plurality of resonant cavities and a plurality of dielectric resonators corresponding to plurality of resonant cavities respectively to produce multi-level coupling when electromagnetic waves pass through the resonant cavities, so as to achieve the function of selecting frequency. The dielectric cavity filter is widely used in systems of mobile communication, microwave communication, etc.

In some system applications, the frequency of the dielectric cavity filter is not fixed to a single frequency, but the dielectric cavity filter can have several different center frequencies at the same time. With the development of technology and product application, system requirements are getting higher and higher, and the demand for signal quality is also getting higher and higher. In addition, the space is limited. The conventional linear arrangement of the dielectric filter in the past could no longer satisfy the requirements, and thus the dielectric cavity filter with the cross-coupling function was introduced.

The conventional dielectric cavity filter with the cross-coupling function adopts the structure of a flight rod assembly to realize the cross-coupling effect. Specifically, the flight rod assembly mainly includes a metal column and a Teflon structure arranged on both sides of the metal column separately. The Teflon structure can provide insulation and can be used to fix the metal column. The flight rod assembly is arranged and spanned between the two resonant cavities, so that the width of a coupling window between the two resonant cavities can be changed to match the coupling coefficient with the final resonant frequency requirements. However, in the filters with different resonant frequency requirements, the entire conventional dielectric cavity filter must be disassembled to replace the internal flight rod assembly, in order to adjust the cross-coupling amount, and thus consuming much time and effort. In addition, due to the characteristics of the composite material required for making the flight rod assembly, it is necessary to prepare a variety of different materials for the production of the filter, and thus having a negative impact on the overall process and cost control.

SUMMARY OF THE INVENTION

Therefore, it is a primary objective of the present disclosure to provide an embodiment of a cross-coupling structure for dielectric cavity filters, which can easily and conveniently achieve the function of adjusting the cross-coupling amount.

To achieve the aforementioned and other objectives, this disclosure provides a cross-coupling structure for dielectric cavity filters that includes a base and a tuner. The base is defined and communicated with a plurality of resonant cavities, a side through hole and a blind hole, wherein each of the resonant cavities has a first channel between two adjacent resonant cavities which are not used for producing the cross-coupling, and a second channel between two adjacent resonant cavities which are used for producing the cross-coupling; the side through hole is penetrated through the base and communicated with the second channel; and the blind hole is formed on a wall of the second channel and has an opening facing the side through hole. The tuner is entered into the second channel from the side through hole and extended into the blind hole, wherein the tuner is adjustably moved between the opening of the blind hole and a hole bottom of the blind hole and provided for setting a cross-coupling amount target value.

Therefore, the cross-coupling structure for dielectric cavity filters can have the function of adjusting the cross-coupling amount by simply adjusting the tuner to the level of being submerged from the outside of the base. The cross-coupling structure has the features of simple and convenient operation, high reliability, and simple structure which does not require too many different types of materials and can simplify the manufacturing process and reduce the material cost.

DESCRIPTION OF THE PREFERRED EMBODIMENTS

The technical characteristics, contents, advantages and effects of the present invention will become apparent from the following detailed description taken with the accompanying drawing.

In the description of this disclosure, it should be understood that the terms "a" and "one" are used as a unit, an element and a component for the description of this specification to facilitate the description and provide a general meaning to the scope of the disclosure, so that both "a" and "one" refer to one or at least one including an odd or even number, unless otherwise specified.

In the description of this disclosure, the terms "comprising", "including", "having" or any other similar terminologies are intended to cover non-exclusive contents. These terms are not limited to the elements listed in the specification only, but also include other usually inherent elements, structures, products or devices which are not listed specifically.

In the description of this disclosure, the terms "first" and "second" are used for simplifying the description only, but should not be understood as indicating or implying the relative importance or the quantity of the technical characteristics as implied or indicated. Therefore, the characteristic limiting the "first" and the "second" may indicate or imply one or more characteristics, and these terms can be used interchangeably without affecting the embodiment disclosed herein or other relevant embodiments.

In the description of this disclosure, the terms "about", "approximately", "close to" and "substantially" shall generally mean "any approximation of a given value" or "any approximation of a given range", and the value or range will change according to the relevant field and is consistent with the broadest interpretation understood by those skilled in the art to cover similar implementations and all modifications based on such changes. In some embodiments, these terms generally refer to a deviation within 20% of the "given value" or "given range", further within 10%, and further within 5%. "The numerical values given in this specification are approximate" means that if not expressly stated, these quantitative values can be inferred to belong to the category of "about", "approximately", "close to" or "substantially", or are meant to include other approximate values.

Figure 1:
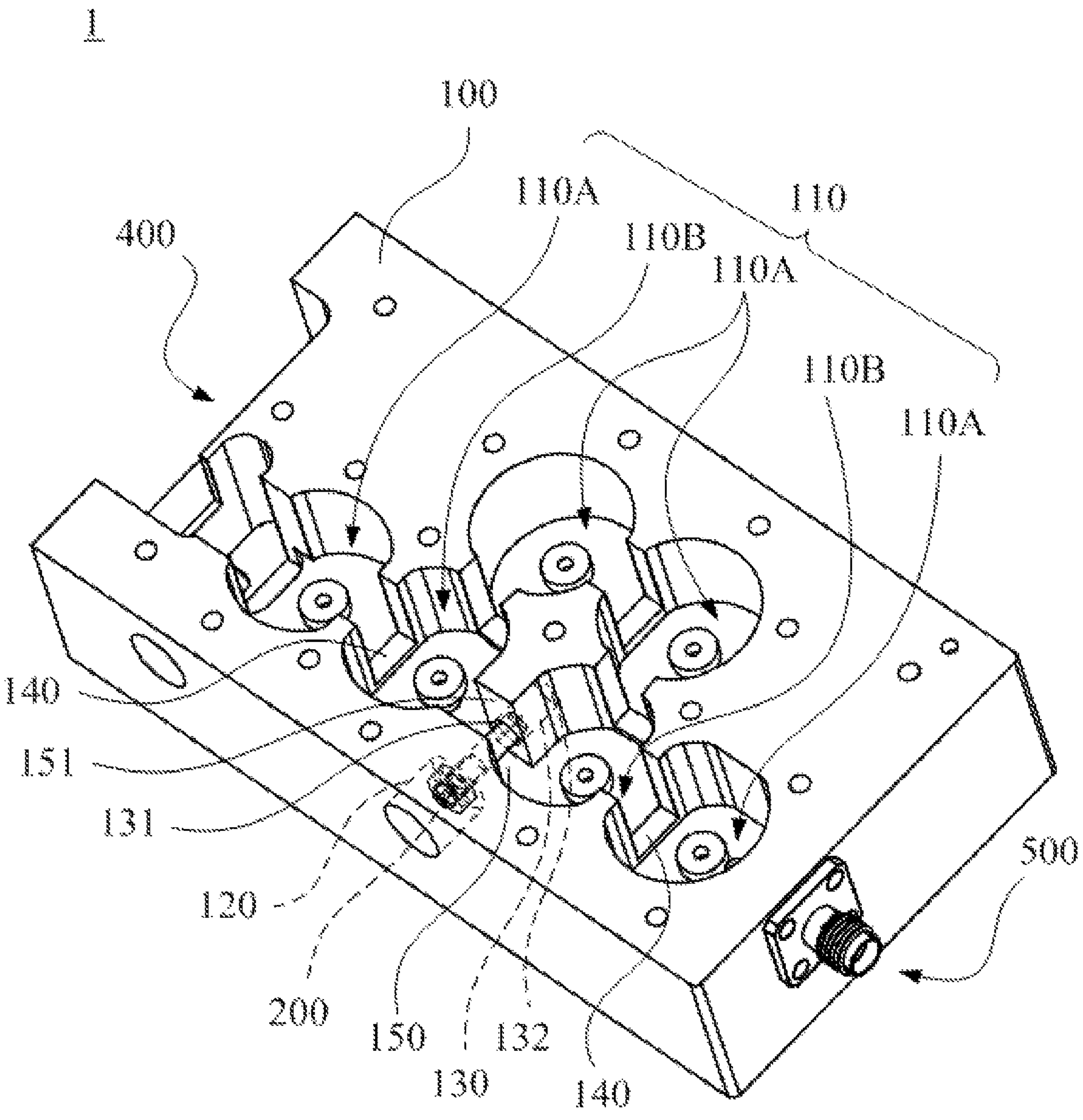
FIG. 1 is a perspective view of a cross-coupling structure for dielectric cavity filters in accordance with an embodiment of this disclosure.
Figure 2:
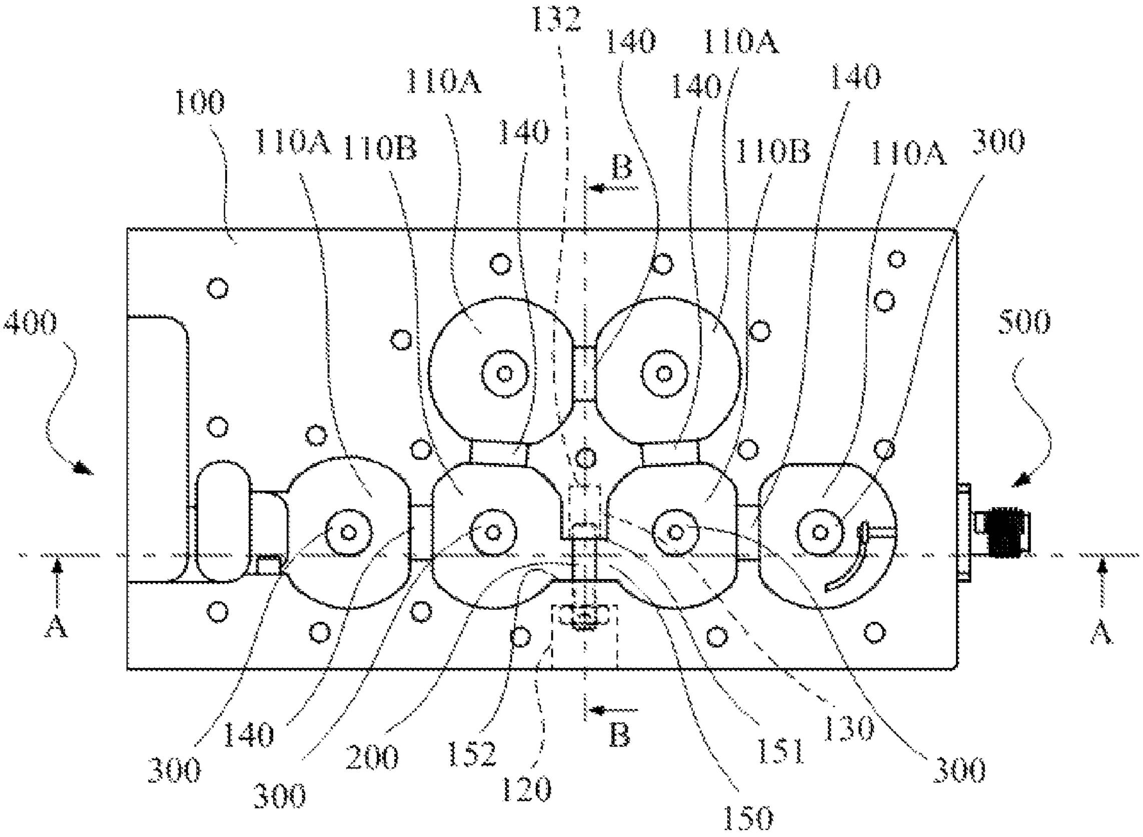
FIG. 2 is a top view of the cross-coupling structure of FIG. 1.

With reference to FIGS. 1 to 4 for a perspective view of a cross-coupling structure for dielectric cavity filters in accordance with an embodiment of this disclosure, a top view of the cross-coupling structure as depicted in FIG. 1, a partial blowup view of the cross-coupling structure as depicted in FIG. 1, and a cross-sectional view of Section A-A of the cross-coupling structure as depicted in FIG. 2 respectively, the cross-coupling structure 1 can be used in the communication system as a dielectric cavity filter of TE mode, so that a stationary wave oscillation is formed in the transmitted electromagnetic waves to achieve a filtering effect, so as to improve the quality of the received signals.

In FIG. 1, the cross-coupling structure 1 mainly includes a base 100 and a tuner 200.

Figure 3:
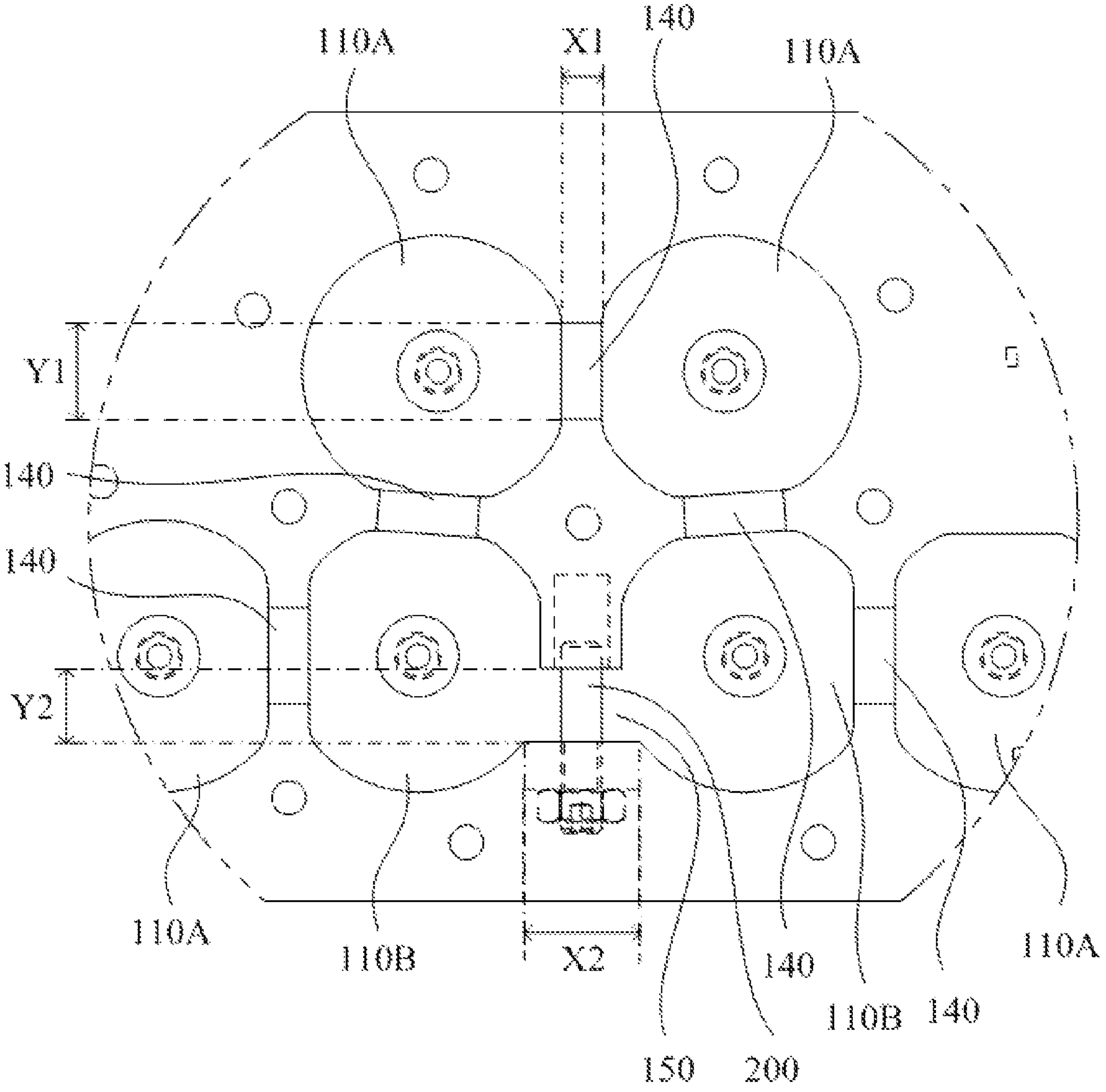
FIG. 3 is a partial blowup view of the cross-coupling structure of FIG. 1.

With reference to FIGS. 2 and 3, the base 100 is defined and communicated with a plurality of resonant cavities 110, a side through hole 120, and a blind hole 130.

With reference to FIGS. 1 to 3 for a dielectric cavity filter having six cavities which are represented by six numerals, respectively 110A, 110A, 110A, 110A 110B and 110B in the figures. In these six resonant cavities, a first channel 140 is formed between any adjacent resonant cavities to produce coupling between ordinary resonant cavities (but not to produce cross-coupling). In general, the width Y1 of the first channel 140 is used to set the coupling amount. The greater the width, the greater the coupling amount. The first channel 140 is (or can be) called a gap in the partition wall between two adjacent resonant cavities.

The resonant cavities 110 can further be defined as the two resonant cavities 110B provided for producing the cross-coupling. Based on the additional design of a coupling path (second channel 150) between the two resonant cavities 110B, the filter can have a better frequency response to achieve a higher degree of isolation between different channels.

These two resonant cavities 110B are configured to be adjacent to each other and the top and left and right sides of the two resonant cavities 110B are provided with a resonant cavity 110A separately. Wherein, the resonant cavities 110A disposed on the left and right sides of the two resonant cavities 110B respectively are connected to an input part 400 and an output part 500 of signals, and the positions of the input part 400 and the output part 500 are provided in the figure for illustration only, but they can be adjusted according to actual requirements or applications. The opening of the resonant cavities 110 is formed at the top of the base 100, and a cover (not shown in the figure) is covered onto the base 100 to form a filter, wherein a through hole can be formed on the cover and configured to be corresponsive to the tuner (not shown in the figure) of each dielectric resonator 300, and these components are like a general dielectric cavity filter that can be used to adjust the frequency and bandwidth of each resonant cavity, which are prior art and will not be described in detail here.

In an embodiment as shown in FIG. 3, the embodiment is intended for illustrating the following technical characteristics but not for limiting the scope of this disclosure, so that the embodiment is considered to be illustrative rather than restrictive. A first channel 140 is formed between two adjacent resonant cavities which are not used for producing a cross-coupling effect, and a second channel 150 is formed between two adjacent resonant cavities which are used for producing a cross-coupling effect. The size of the first channel 140 is different from that of the second channel 150. The width Y1 of the first channel 140 is greater than the width Y2 of the second channel 150. The length X1 of the first channel 140 is smaller than the length X2 of the second channel 150. The first channel 140 is substantially connected to a middle part between two adjacent resonant cavities, and the second channel 150 is substantially connected to a side part between two adjacent resonant cavities.

As shown in FIGS. 1 to 3, the side through hole 120 is penetrated through the base 100 and communicated with the second channel 150, and the side through hole 120 is formed on a sidewall of the base 100. In other words, the opening of the side through hole 120 facing outward and the opening of the resonant cavities 110 are disposed on two adjacent sides of the base 100 respectively.

The blind hole 130 is formed on a wall 151 of the second channel 150, and the opening 131 of the blind hole 130 faces the side through hole 120. The second channel 150 is defined by two opposite wall surfaces 151, 152, wherein the blind hole 130 is formed on the wall 151 and the side through hole 120 is formed on the wall 152.

The tuner 200 is entered into the second channel 150 from the side through hole 120 and extended into the blind hole 130. Wherein, the tuner 200 is adjustably moved between the opening 131 of the blind hole 130 and a hole bottom 132 of the blind hole 130 and provided for setting a cross-coupling amount target value. In other words, the tuner 200 can be operated to move, such that when its end is closer to or farther from the hole bottom 132 of the blind hole 130 (which is the extent of extending the tuner 200 into the blind hole 130), the electrical properties of the cross-coupling structure 1 are changed to achieve the effect of adjusting the cross-coupling amount.

In this way, the cross-coupling structure 1 of this embodiment can provide the function of adjusting the cross-coupling amount, and operators can fine-tune the cross-coupling amount based on the required operating frequency. In addition, the method for adjusting the tuner 200 is convenient and simple, and the tuner 200 can be operated from the outside of the base 100 to change its extent of extending into the blind hole 130 without requiring any complicated assembly and disassembly process. The cross-coupling structure 1 can be installed on tuner 200 of the base 100. By changing the extent of extending the tuner 200 into the blind hole 130, the conventional effect of adjusting the cross-coupling amount can be achieved by using the flight rod assembly. Compared with the conventional flight rod assembly structure, the cross-coupling structure 1 of this embodiment has relatively simple types of materials, and thus simplifying the manufacturing process and reducing the manufacturing cost.

As an example, the tuner 200 is a screw, and the side through hole 120 has an internal thread matched with the screw, and the tuner 200 is operable to be screwed inward or unscrewed outward relative to the side through hole 120 by the thread connection in order to adjust the extent of extending the tuner 200 into the blind hole 130. Wherein, the material of the screw used as the tuner 200 can be metal or non-metal, but there is no special limitation, and the material can be changed according to the required electrical properties. In addition, the tuner is not limited to the screw, but it can also be a combination of a screw rod and a nut (and the material is also not specifically limited), or other structures that allow the tuner to be assembled on the base and can adjust the extent of extending the tuner into the blind hole.

In an embodiment as shown in FIGS. 2 and 3, the embodiment is intended for illustrating the following technical characteristics but not for limiting the scope of this disclosure, so that the embodiment is considered to be illustrative rather than restrictive. The second channel 150 is narrower than the first channel 140, and the length X2 of the second channel 150 is longer than the first channel 140. In FIG. 1, the height of the wall of the second channel 150 is greater than that of the first channel 140 (since the first channel 140 has a protrusion higher than the cavity bottom of each resonant cavity).

Figure 4:
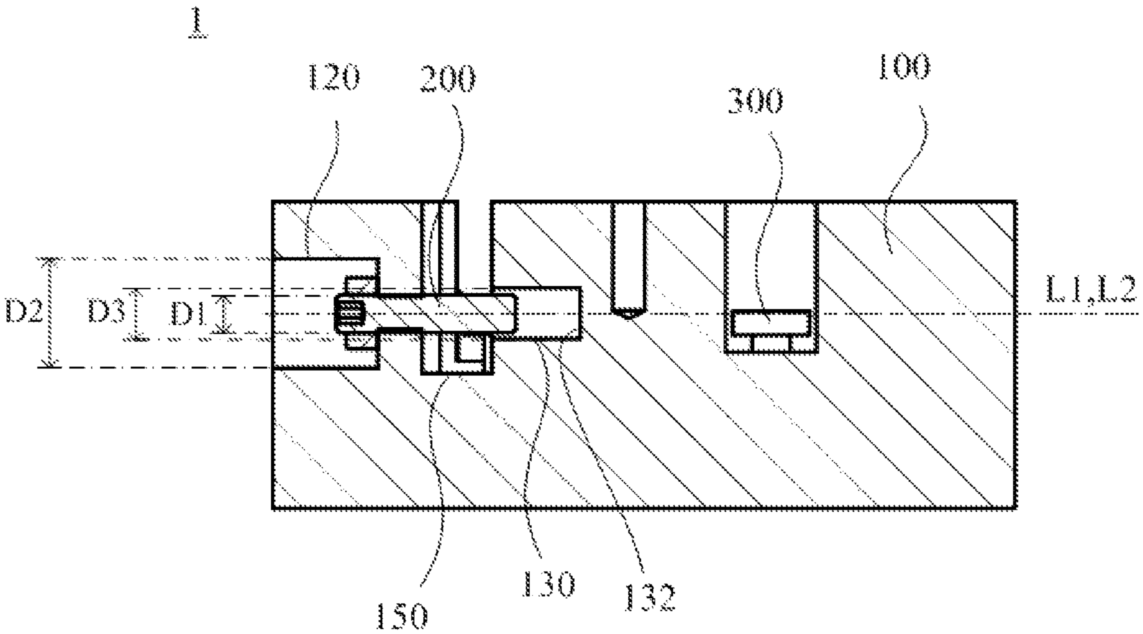
FIG. 4 is a cross-sectional view of Section A-A of the cross-coupling structure of FIG. 2.

In FIG. 4, the side through hole 120 has a first hole diameter D1 and a second hole diameter D2, and the first hole diameter D1 is smaller than the second hole diameter D2, and the side through hole 120 is provided with an internal thread formed on an inner side of the section having the first hole diameter D1, and the first hole diameter D1 is configured to be at a position closer to the second channel 150 than the configured position of the second hole diameter D2. Therefore, an end of the tuner 200 (such as the head of a screw) can be accommodated into the side through hole 120, and the tuner 200 will not be protruded from the surface of the base 100.

The blind hole 130 has a third hole diameter D3, and the third hole diameter D3 is greater than the first hole diameter D1 and greater than the outer diameter of the tuner 200. Therefore, when the tuner 200 is extended into the blind hole 130, the space inside the blind hole 130 still has a gap communicated with the second channel 150, that is, the space of the blind hole 130 is still communicated with the two adjacent resonant cavities 110B, and thus the size of the space in the blind hole 130 can be used to affect the electromagnetic coupling amount between two resonant cavities 110B. By controlling the extent of extending the tuner 200 into the blind hole 130, or controlling the distance between an end of the tuner 200 and the hole bottom 132 of the blind hole 130, the energy of the electromagnetic wave oscillation can be changed, so as to conveniently fine tune the cross-coupling amount for producing the cross-coupling effect in the filter. Therefore, the cross-coupling structure 1 of this embodiment can set the cross-coupling amount target value of the cross-coupling structure 1 according to the requirements and applications.

In this embodiment, the central axis L2 of the side through hole 120 is disposed at a position lower than a half-height position of a wall of the second channel 150 (which is the position at the half height of the second channel 150). In other words, the position side through hole 120 is not exactly disposed at the central position of the height H of the second channel 150, but it is closer to the bottom of the second channel 150, such that after the tuner 200 is assembled, the tuner is closer to the bottom of the second channel 150 than the top of the base 100.

Figure 5:
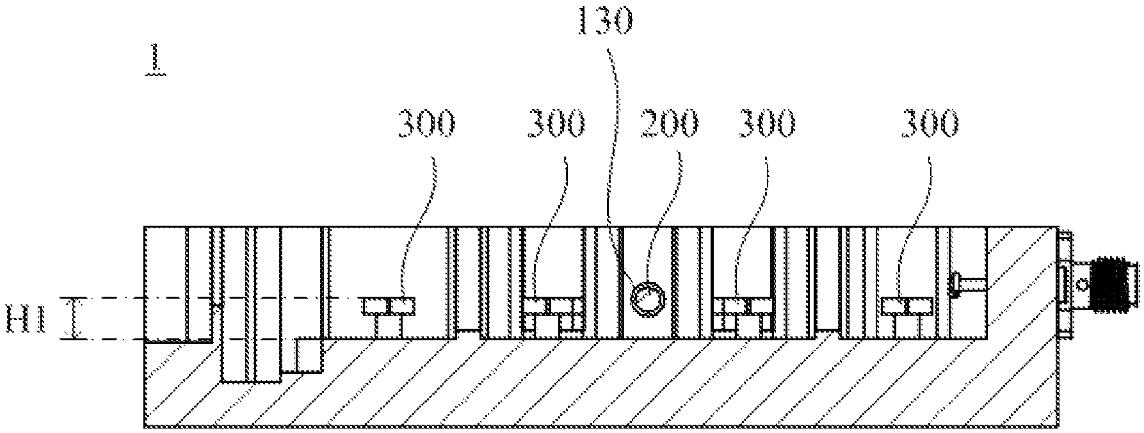
FIG. 5 is a cross-sectional view of Section B-B of the cross-coupling structure of FIG. 2.

With reference to FIG. 5 for a cross-sectional view of Section B-B of the cross-coupling structure of FIG. 2, the bottom of each of the resonant cavities 110 is provided with a dielectric resonator 300, and each dielectric resonator 300 is protruded from the bottom of the resonant cavity 110 and has a support column and a disc structure disposed on the support column, and the resonant frequency of the resonant cavity 110 is determined by the distance between the dielectric resonator 300 and the tuner (not shown in the figure) corresponding to the upper cover (not shown in the figure). In general, the distance between the central axis L1 of the blind hole 130 and a bottom surface 151 of the second channel 150 is approximately equal to the average height Hi of each dielectric resonator 300. In other words, after the tuner 200 is assembled, the horizontal height of the assembled tuner 200 is about the horizontal height of the dielectric resonator 300. In the example of this embodiment, the distance of the central axis L1 of the blind hole 130 (or the side through hole 120) from the bottom surface of the second channel 150 is about 4.75 mm, and the height H1 of the dielectric resonator 300 in the resonant cavity 110B used for producing the cross-coupling effect is about 4.88 mm. However, these values are parameters that can be adjusted according to actual needs, and are not limited to the examples shown in this embodiment and drawings.

In summation of the description above, the cross-coupling structure for dielectric cavity filters of this embodiment has the function of adjusting the cross-coupling amount by simply adjusting the level of being submerged of the tuner from the outside of the base. The cross-coupling structure has the features of simple and convenient operation, high reliability, and simple structure which does not require too many different types of materials and can simplify the manufacturing process and reduce the material cost.

While this disclosure has been described by means of specific embodiments, numerous modifications and variations could be made thereto by those skilled in the art without departing from the scope and spirit of the disclosure set forth in the claims.

What is claimed is:

1. A cross-coupling structure for dielectric cavity filters, comprising:

a base, comprising a plurality of resonant cavities, a side through hole and a blind hole which are defined on and communicated with the base, and each of the resonant cavities having a first channel formed between two adjacent resonant cavities which is not provided for producing a cross-coupling, and a second channel formed between two adjacent resonant cavities which is provided for producing a cross-coupling, and the side through hole being penetrated through the base and communicated with the second channel, and the blind hole being configured on a wall of the second channel and having an opening facing the side through hole; and a tuner, entered into the second channel from the side through hole and extended into the blind hole, wherein the tuner is adjustably moved between the opening of the blind hole and the bottom of the blind hole for setting a cross-coupling amount target value.

2. The cross-coupling structure for dielectric cavity filters according to claim 1, wherein the tuner is an assembly of a screw or a threaded rod and a nut, and the side through hole has an internal thread matched with the tuner.

3. The cross-coupling structure for dielectric cavity filters according to claim 2, wherein the side through hole has a first hole diameter and a second hole diameter, and the first hole diameter is smaller than the second hole diameter, and the first hole diameter is configured at a position to be nearer to the second channel than that of the second hole diameter, and the side through hole has an internal thread formed at a section having the first hole diameter on the inner side of the side through hole.

4. The cross-coupling structure for dielectric cavity filters according to claim 3, wherein the blind hole has a third hole diameter, and the third hole diameter is greater than the first hole diameter.

5. The cross-coupling structure for dielectric cavity filters according to claim 4, wherein the bottom of each resonant cavity is installed with a dielectric resonator, and the central axis of the blind hole is substantially equal to the height of each dielectric resonator.

6. The cross-coupling structure for dielectric cavity filters according to claim 4, wherein the central axis of the side through hole is below the half-height position of the wall of the second channel.

* * * * *